United States Patent
Metzger et al.

(10) Patent No.: US 6,316,119 B1
(45) Date of Patent: Nov. 13, 2001

(54) MULTI-COMPONENT COMPOSITE COATING COMPOSITION AND COATED SUBSTRATE

(75) Inventors: Walter Metzger, Denkendorf (DE); Robyn E. McMillan, Allison Park, PA (US); Debra L. Singer; James E. Reddy, both of Wexford, PA (US); Shanti Swarup, Allison Park, PA (US); Kurt G. Olson, Gibsonia, PA (US); Djurdjica Glas, Stuttgart (DE); Timothy J. Kosto, Troy, NY (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/250,527

(22) Filed: Feb. 16, 1999

Related U.S. Application Data

(60) Provisional application No. 60/075,030, filed on Feb. 18, 1998.

(51) Int. Cl.[7] .................................................. B32B 27/08
(52) U.S. Cl. .................. 428/520; 428/474.4; 428/480; 428/423.1
(58) Field of Search .................. 524/315, 318, 524/320, 328, 284, 513; 428/440, 423.1, 520, 474.4, 411.1; 525/176, 440; 523/501

(56) References Cited

U.S. PATENT DOCUMENTS

| | | | |
|---|---|---|---|
| Re. 33,008 | 8/1989 | Ruffner et al. ................ 526/270 |
| 3,684,759 | 8/1972 | Reiff et al. .................. 260/29.6 NR |
| 4,070,323 | 1/1978 | Vanderhoff et al. ......... 260/29.6 NR |
| 4,271,051 | 6/1981 | Eschwey ...................... 260/22 M |
| 4,335,029 | 6/1982 | Dabi et al. ....................... 524/589 |
| 4,343,925 | * 8/1982 | Chang et al. .................... 525/440 |
| 4,384,103 | * 5/1983 | Chattha ............................... 528/83 |
| 4,451,596 | 5/1984 | Wilk et al. ........................ 523/501 |
| 4,616,074 | 10/1986 | Ruffner ............................. 526/318 |
| 4,719,132 | 1/1988 | Porter, Jr. ......................... 427/409 |
| 4,791,168 | 12/1988 | Salatin et al. .................... 524/601 |
| 4,851,460 | 7/1989 | Stranghöner et al. ............ 523/407 |
| 5,015,688 | 5/1991 | Bederke et al. .................. 524/600 |
| 5,026,818 | * 6/1991 | Heinz et al. ...................... 528/313 |
| 5,071,904 | 12/1991 | Martin et al. ..................... 524/458 |
| 5,098,947 | 3/1992 | Metzger et al. .................. 524/507 |
| 5,136,004 | 8/1992 | Bederke et al. .................. 526/273 |
| 5,155,163 | 10/1992 | Abeywardena et al. ......... 524/591 |
| 5,342,882 | 8/1994 | Göbel et al. ...................... 524/832 |
| 5,354,807 | 10/1994 | Dochniak ......................... 524/591 |
| 5,356,973 | 10/1994 | Taljan et al. ...................... 524/314 |
| 5,368,944 | * 11/1994 | Hartung et al. ................ 428/423.1 |
| 5,401,790 | 3/1995 | Poole et al. ....................... 524/199 |
| 5,412,023 | 5/1995 | Hille et al. ........................ 524/539 |
| 5,459,197 | 10/1995 | Schwindt et al. ................ 524/591 |
| 5,460,892 | * 10/1995 | Bederke et al. .................. 428/482 |
| 5,468,802 | 11/1995 | Wilt et al. ......................... 524/539 |
| 5,554,686 | 9/1996 | Frisch, Jr. et al. ................ 524/588 |
| 5,589,534 | 12/1996 | Metzger et al. .................. 524/548 |
| 5,614,584 | 3/1997 | Schwan et al. ................... 524/591 |
| 5,635,559 | 6/1997 | Brock et al. ...................... 524/839 |
| 5,646,214 | 7/1997 | Mayo ................................. 525/10 |
| 5,648,410 | 7/1997 | Hille et al. ........................ 523/501 |
| 5,684,072 | 11/1997 | Rardon et al. .................... 524/199 |
| 5,698,330 | 12/1997 | Bederke et al. ................ 428/423.1 |
| 5,703,155 | 12/1997 | Swarup et al. ................... 524/558 |
| 5,741,552 | * 4/1998 | Takayama et al. .............. 427/407.1 |
| 5,759,694 | 6/1998 | Mayo et al. .................... 428/423.1 |
| 5,814,410 | 9/1998 | Singer et al. .................. 428/423.1 |
| 5,925,698 | * 7/1999 | Steckel ............................. 524/322 |

FOREIGN PATENT DOCUMENTS

| | | |
|---|---|---|
| 69839A | 8/1984 | (EP) . |
| 0038127 | 10/1984 | (EP) . |
| 0210747 | 2/1987 | (EP) . |
| 0238166 B1 | 9/1991 | (EP) . |
| 0567214 A1 | 10/1993 | (EP) . |
| 0238166 B2 | 9/1994 | (EP) . |
| 0794212 | 9/1997 | (EP) . |
| 1579672 | 6/1977 | (GB) . |
| 1579672 | 11/1980 | (GB) . |
| WO94/05733 | 3/1994 | (WO) . |
| WO 95/07951 | 3/1995 | (WO) . |
| WO95/27013 | 10/1995 | (WO) . |
| WO97/30097 | 8/1997 | (WO) . |

\* cited by examiner

*Primary Examiner*—Blaine Copenheaver
*Assistant Examiner*—Christopher Paulraj
(74) *Attorney, Agent, or Firm*—Deborah M. Altman

(57) ABSTRACT

A multi-component composite coating composition is provided which includes a basecoat deposited from an aqueous basecoat film-forming composition and a transparent topcoat applied over the basecoat, the transparent topcoat being deposited from a topcoat film-forming composition. The topcoat film-forming composition includes one or more crosslinkable film-forming resins and one or more amphiphilic adjuvants including: a water-soluble polar end having at least one terminal hydrophilic group selected from hydroxyl groups, carbamate groups, amide groups and urea groups; and a water-insoluble hydrocarbon end having at least six contiguous carbon atoms. The adjuvant has an acid value of less than 30 and is present in an amount ranging from about 0.01 to about 25 weight percent on a basis of total resin solids of the topcoat film-forming composition.

21 Claims, No Drawings

MULTI-COMPONENT COMPOSITE COATING COMPOSITION AND COATED SUBSTRATE

CROSS-REFERENCE TO RELATED APPLICATION

This patent application is related to provisional U.S. patent application Ser. No. 60/075,030 entitled "Low Temperature Cure Waterborne Coating Compositions Having Improved Appearance And Humidity Resistance", filed Feb. 18, 1998.

FIELD OF THE INVENTION

The present invention relates to aqueous coating compositions and, more particularly, to multi-component composite coating compositions including pigmented or colored basecoats overcoated with transparent or clear topcoats which provide good smoothness and appearance in automotive coating applications.

BACKGROUND OF THE INVENTION

Over the past decade, there has been a concerted effort to reduce atmospheric pollution caused by volatile solvents which are emitted during the painting process. However, it is often difficult to achieve high quality, smooth coating finishes, such as are required in the automotive industry, without using organic solvents which contribute greatly to flow and leveling of a coating.

One of the major goals of the coatings industry is to minimize the use of organic solvents by formulating waterborne coating compositions which provide a smooth, high gloss appearance, as well as good physical properties including resistance to acid rain. Unfortunately, many waterborne coating compositions do not provide acceptable appearance. A particularly acute problem is cratering or the development of small depressions in the surface of the coating. One solution to the cratering problem is to eliminate sources of contaminates in the coatings. However, it is generally impractical to eliminate sources of contamination in an industrial setting. Other coating appearance problems can be attributed to poor flow and leveling.

Another challenge to formulators of waterborne coatings is to provide good acid resistance, particularly battery acid resistance, while maintaining acceptable physical properties. Lack of humidity resistance or blushing is another problem facing waterborne coating formulators.

Therefore, it would be desirable to provide a waterborne coating composition which is useful as an original finish for automobiles and which can be applied as a smooth, acid resistant film under a variety of conditions with minimal cratering or blushing.

SUMMARY OF THE INVENTION

The present invention provides a multi-component composite coating composition comprising a basecoat deposited from an aqueous basecoat film-forming composition and a transparent topcoat applied over the basecoat in which the transparent topcoat is deposited from a topcoat film-forming composition, the topcoat film-forming composition comprising: (a) at least one crosslinkable film-forming resin; and (b) at least one amphiphilic adjuvant comprising: a water-soluble polar end comprising at least one terminal hydrophilic group selected from the group consisting of hydroxyl groups, carbamate groups, amide groups and urea groups; and a water-insoluble hydrocarbon end comprising at least six contiguous carbon atoms, wherein the adjuvant has an acid value of less than 30 and is present in an amount ranging from about 0.01 to about 25 weight percent on a basis of total resin solids of the topcoat film-forming composition. A substrate having a surface coating of the above multi-component composite coating composition is also provided.

DETAILED DESCRIPTION OF THE PREFERRED EMBODIMENTS

The multi-component composite coating composition of the present invention is useful in a variety of coating applications, and is particularly useful in automotive coating applications. The multi-component composite coating composition comprises a basecoat layer and a transparent or clear topcoat layer formed from an aqueous topcoat coating composition which is applied over the basecoat.

The aqueous topcoat coating composition of the present invention comprises one or more crosslinkable film-forming resins and one or more amphiphilic adjuvants, which will be discussed in detail below.

Useful crosslinkable film-forming resins include acrylic polymers, polyesters, including alkyds, polyurethanes, polyamides, polyethers and copolymers and mixtures thereof. These resins can be self-crosslinking or crosslinked by reaction with suitable crosslinking materials included in the topcoat composition.

Suitable crosslinkable film-forming resins include acrylic polymers such as copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups which are often incorporated into the polymer by including one or more hydroxyl functional monomers in the reactants used to produce the copolymer. Useful hydroxyl functional monomers include hydroxyalkyl acrylates and methacrylates, preferably having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates. The acrylic polymer can be prepared with N-(alkoxymethyl)acrylamides and N-(alkoxymethyl) methacrylamides which result in self-crosslinking acrylic polymers.

The preferred crosslinkable film-forming resin comprises an acrylic polyol polymer. Such polymers can be prepared by polymerizing one or more ethylenically unsaturated beta-hydroxy ester functional monomers, one or more polymerizable ethylenically unsaturated, hydroxyalkyl functional monomers, and optionally one or more vinyl aromatic monomers, one or more alkyl esters of acrylic or methacrylic acid and at least one other ethylenically unsaturated monomer.

The beta-hydroxy ester functional monomer can be prepared from ethylenically unsaturated, epoxy functional monomers and carboxylic acids having from about 13 to about 20 carbon atoms or ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred. Examples of carboxylic acids include saturated monocarboxylic acids such as isostearic acid and aromatic unsaturated carboxylic acids.

Useful ethylenically unsaturated acid functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation which would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Preferred glycidyl esters include those of the structure:

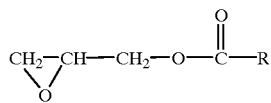

where R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Carbamate functional groups can be included in the acrylic polyol polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Other useful carbamate functional monomers are disclosed in U.S. Pat. No. 5,098,947, which is incorporated herein by reference.

Acrylic polymers can be prepared via aqueous emulsion polymerization techniques and used directly in the preparation of the aqueous coating composition, or via organic solution polymerization techniques with groups capable of salt formation such as acid or amine groups. Upon neutralization of these groups with a base or acid, the polymers can be dispersed into aqueous medium.

As discussed above, the crosslinkable film-forming resin can be an alkyd resin or a polyester. Such polymers can be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid and trimellitic acid. Besides the polycarboxylic acids mentioned above, functional equivalents of the acids such as anhydrides where they exist or lower alkyl esters of the acids such as methyl esters can be used. Where it is desired to produce air-drying alkyd resins, suitable drying oil fatty acids can be used and include those derived from linseed oil, soya bean oil, tall oil, dehydrated castor oil, or tung oil. The polyesters and alkyd resins can contain a portion of free hydroxyl and/or carboxyl groups which are available for further crosslinking reactions.

Polyurethanes can also be used as the crosslinkable film-forming resin of the coating composition. Useful polyurethanes include polymeric polyols which are prepared by reacting polyester polyols or acrylic polyols, such as those mentioned above, with a polyisocyanate such that the OH/NCO equivalent ratio is greater than 1:1 so that free hydroxyl groups are present in the product.

The organic polyisocyanate which is used to prepare the polyurethane polyol can be an aliphatic or aromatic polyisocyanate or mixtures thereof. Diisocyanates are preferred, although higher polyisocyanates can be used in place of or in combination with diisocyanates. Examples of suitable aromatic diisocyanates include 4,4'-diphenylmethane diisocyanate and toluene diisocyanate. Examples of suitable aliphatic diisocyanates include straight chain aliphatic diisocyanates such as 1,6-hexamethylene diisocyanate. Also, cycloaliphatic diisocyanates such as isophorone diisocyanate and 4,4'-methylene-bis-(cyclohexyl isocyanate) can be used. Examples of suitable higher polyisocyanates include 1,2,4-benzene triisocyanate and polymethylene polyphenyl isocyanate.

Usually the polyester and polyurethane are prepared with unreacted carboxylic acid groups, which upon neutralization with bases such as amines allows for dispersion into aqueous medium.

Other useful crosslinkable film-forming resins include polyamides, such as acrylamide, methacrylamide, N-alkylacrylamides and N-alkylmethacrylamides.

Polyethers can also be used as crosslinkable film-forming resins in clearcoat coating compositions of the present invention such as polypropylene glycol.

Generally, suitable crosslinkable film-forming resins have a weight average molecular weight greater than about 2000 grams per mole, preferably ranging from about 2000 to about 100,000 grams per mole (as determined by gel permeation chromatography using a polystyrene standard) and a hydroxyl equivalent weight ranging from about 400 to about 4000 grams per equivalent. The term "equivalent weight" is a calculated value based on the relative amounts of the various ingredients used in making the specified material and is based on the solids of the specified material. The relative amounts are those that result in the theoretical weight in grams of the material, such as a polymer produced from the ingredients, and give a theoretical number of the particular functional group that is present in the resulting polymer. The theoretical polymer weight is divided by the theoretical number to give the equivalent weight. For example, hydroxyl equivalent weight is based on the equivalents of reactive pendant and/or terminal hydroxyl groups in the hydroxyl-containing polymer.

The crosslinkable film-forming resin can have an acid value ranging from about 5 to about 100 mg KOH/g resin, and preferably about 5 to about 50 mg KOH/g resin. The acid value (number of milligrams of KOH per gram of solid required to neutralize the acid functionality in the resin) is a measure of the amount of acid functionality in the resin.

Generally, the crosslinkable film-forming resin is present in an amount ranging from about 25 to about 100 weight percent on a basis of total resin solids of the topcoat coating composition, preferably about 40 to about 95 weight percent and, more preferably, greater than 70 weight percent to about 95 weight percent.

The aqueous topcoat coating composition can further comprise one or more crosslinking materials capable of reacting with the crosslinkable film-forming resin to form a crosslinked film. The crosslinking material can be present as a mixture with the other components of the topcoat coating composition (conventionally referred to as a one-pack system), or in a separate composition which is mixed with the crosslinkable film-forming resin within a few hours prior to application of the coating composition to the substrate (conventionally referred to as a two-pack system).

Suitable crosslinking materials include aminoplasts, polyisocyanates, polyacids, anhydrides and mixtures thereof. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins preferably contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. The preferred aminoplast resins are partially alkylated with methanol or butanol.

The polyisocyanate which is utilized as a crosslinking agent can be prepared from a variety of isocyanate-containing materials. Preferably, the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures such as lower aliphatic alcohols including methanol, oximes such as methyl ethyl ketoxime, lactams such as caprolactam and pyrazoles such as dimethyl pyrazole.

Preferably, the crosslinking material is a mixture of partially alkylated melamine formaldehyde condensates and a carbamoyl triazine.

Generally, the crosslinking material is present in an amount ranging from about 5 to about 50 weight percent on a basis of total resin solids of the topcoat coating composition, preferably about 10 to about 35 weight percent and, more preferably, about 15 to about 25 weight percent.

In an important aspect of the present invention, the topcoat coating composition comprises one or more amphiphilic adjuvants. The amphiphilic adjuvant has a water-soluble, generally hydrophilic polar end and a water-insoluble, generally hydrophobic hydrocarbon end.

The adjuvant can be present as a compound consisting of a single molecular species, oligomer or polymer, but preferably is an oligomer having a number average molecular weight ranging from about 200 to about 3000 grams per mole, and more preferably about 300 to about 800 grams per mole, as determined by gel permeation chromatography using polystyrene as a standard.

The adjuvant is preferably essentially free of acid functionality, i.e., it has an acid value of less than 30 mg KOH/g adjuvant, preferably less than about 20 mg KOH/g adjuvant, more preferably less than about 10 mg KOH/g adjuvant, and most preferably less than about 5 mg KOH/g adjuvant.

The adjuvant has one or more terminal hydrophilic groups positioned at its water-soluble polar end. Suitable hydrophilic groups include hydroxyl groups (preferred), carbamate groups, amide groups, urea groups and mercaptan groups. One or more or combinations of these groups can be present as pendant functional groups along the backbone of the adjuvant. Preferably, the hydrophilic polar end of the adjuvant has one or more, and preferably an average of one to about three, terminal hydroxyl groups.

The hydrocarbon end of the adjuvant can be a pendant or terminal end group, but preferably is a terminal end group positioned generally opposite to the water-soluble polar end of the adjuvant. The hydrocarbon end of the adjuvant comprises at least six contiguous carbon atoms, preferably in a linear hydrocarbon chain. In a preferred embodiment, the hydrocarbon end includes at least 7 contiguous carbon atoms, preferably 7 to about 24, and more preferably 7 to about 18 contiguous carbon atoms. Preferably, the hydrocarbon end of the adjuvant is free of hydrophilic functional groups.

The adjuvant can be saturated or unsaturated, but preferably it is at least substantially saturated along the hydrocarbon chain. The adjuvant can be branched or unbranched, and can include functional groups such ester groups and/or ether groups and/or other functional groups containing nitrogen, oxygen, or sulfur. Preferably such functional groups are not positioned near the hydrophobic end.

Generally, the adjuvant has a hydroxyl number which is greater than about 100 mg KOH/g of adjuvant, preferably ranges from about 100 to about 300 mg KOH/g, and more preferably about 150 to about 250 mg KOH/g.

In a preferred embodiment, the adjuvant is prepared by esterification of reactants comprising one or more monocarboxylic acids and one or more polyols, preferably in a 1:1 molar ratio. Suitable monocarboxylic acids include heptanoic acid, caprylic acid, pelargonic acid, capric acid, n-undecylic acid, lauric acid, myristic acid, palmitic acid, margaric acid, stearic acid, isostearic acid, arachidic acid, behenic acid, lignoceric acid, cerotic acid, oleic acid, elaidic acid, linoleic acid, linolenic acid, dihydroxystearic acid, ricinoleic acid and isomers and mixtures thereof. Useful polyols include 1,4-butanediol, 1,6-hexanediol, neopentyl glycol, ethylene glycol, diethylene glycol, 2,3-butylene glycol, glycerol, trimethylolpropane, ditrimethylolpropane, pentaerythritol, sorbitol, mannitol and mixtures thereof. The polyol can include terminal groups such as short chain alkyl groups having 1 to 4 carbon atoms or amido groups.

Non-limiting examples of adjuvants prepared by the above esterification reaction include trimethylolpropane monoisostearate, ditrimethylolpropane isostearate, pentaerythritol isostearate and pentaerythritol diisostearate.

Additional reactants can be included in the reaction, such as one or more polycarboxylic acids, polyfunctional amines, polyfunctional isocyanates and mixtures thereof. Useful polycarboxylic acids include 1,4-cyclohexane dicarboxylic acid, dimer fatty acids, and other carboxylic acids such as are disclosed in U.S. Pat. No. 5,468,802 at column 2, lines 49–65 which are incorporated by reference herein. A useful mixture of isomers of 1,4-cyclohexane dicarboxylic acid is commercially available as EASTMAN® 1,4-CHDA from Eastman Kodak. For preparing a reaction product of isostearic acid, trimethylolpropane and 1,4-cyclohexane dicarboxylic acid, a high purity grade of EASTMAN® 1,4-CHDA having approximately 80:20 cis:trans isomers is preferred, although the "R" grade having 60:40 cis:trans also can be used. An example of a suitable adjuvant prepared by the above reaction using an polyfunctional amine instead of a polycarboxylic acid is stearyl diethanolamide.

Generally, if present, the polycarboxylic acid is present as an additional reactant in an amount of less than about 50 weight percent on a basis of total weight of the reactants from which the adjuvant reaction product is prepared, preferably less than about 30 weight percent and, more preferably, less than about 20 weight percent.

The esterification reaction is carried out in accordance with techniques which are well known to those skilled in the art of polymer chemistry and a detailed discussion is not believed to be necessary. Generally, the reaction can be conducted by combining the ingredients and heating to a temperature of about 160° C. to about 230° C. Further details of the esterification process are disclosed in U.S. Pat. No. 5,468,802 at column 3, lines 4–20 and 39–45, which are incorporated by reference herein.

Alternatively, the adjuvant can be prepared from the reaction of one or more polycarboxylic acids, one or more polyols and one or more hydrocarbon alcohols comprising at least six contiguous carbon atoms in a manner well known to one skilled in the art. An example of this reaction is the formation of an oligomeric ester from phthalic anhydride, pentaerythritol and stearyl alcohol. Suitable polycarboxylic acids and polyols are discussed above. Useful hydrocarbon alcohols include heptyl alcohol, octyl alcohol, pelargonic alcohol, n-decyl alcohol, n-undecyl alcohol, lauryl alcohol, myristyl alcohol, cetyl alcohol, margaryl alcohol, stearyl alcohol, isostearyl alcohol, n-nonadecyl alcohol, arachidyl alcohol, ceryl alcohol, palmitoleyl alcohol, oleyl alcohol, linoleyl alcohol, linolenyl alcohol, ricinoleyl alcohol and mixtures thereof.

In another alternative embodiment, the adjuvant can be prepared by reacting one or more amines comprising at least six contiguous carbon atoms and one or more reactants selected from carbonates or polycarboxylic acids and polyols in a manner well known to the skilled artisan. A non-limiting example is the reaction product of stearyl amine with glycerin carbonate to form N-stearyl dihydroxypropyl carbamate. Another example is the oligoamide-ester reaction product of stearyl amine with isophthalic acid and pentaerythritol. Useful amines include heptyl amine, octyl amine, pelargonyl amine, n-decyl amine, n-undecyl amine, lauryl amine, myristyl amine, cetyl amine, margyryl amine, stearyl amine, n-nonadecyl amine, arachidyl amine, and isomers and mixtures thereof. Suitable polycarboxylic acids and polyols are discussed above.

In yet another alternative embodiment, the adjuvant can be prepared by reacting one or more monocarboxylic acids with one or more epoxides, such as the glycidyl ether of versatic acid or glycidol, in a manner well known to one skilled in the art. A non-limiting example of an adjuvant prepared according to this reaction is the reaction product of isostearic acid and glycidol. Useful monocarboxylic acids are discussed above.

The adjuvant of the present invention can be added to the topcoat coating composition neat; that is, it is added by itself or in other resinous ingredients, or with solvents or other diluents.

Generally, the adjuvant is present in an amount ranging from about 0.01 to about 25 weight percent on a basis of total resin solids of the topcoat coating composition, preferably about 0.1 to about 20 weight percent and, more preferably, about 0.1 to about 15 weight percent.

If desired, the coating composition can comprise other optional materials well known in the art of formulated surface coatings, such as surfactants, flow control agents, thixotropic agents such as bentonite clay, fillers, organic cosolvents, catalysts, including phosphonic acids and other customary auxiliaries. These materials can constitute up to 40 percent by weight of the total weight of the coating composition.

The solids content of the aqueous topcoat coating composition generally ranges from about 20 to about 60 weight percent on a basis of total weight of the aqueous topcoat coating composition, preferably about 25 to about 50 weight percent, and more preferably about 30 to about 45 weight percent.

The topcoat coating composition is used to form a clear topcoat in a multi-component composite coating composition, such as a color-plus-clear composite coating. A color-plus-clear composite coating typically comprises a basecoat deposited from a pigmented or colored film-forming composition and a transparent or clear topcoat applied over the basecoat.

The multi-component composite coating composition of the present invention can be applied to various substrates to which they adhere, including wood, metals, glass, cloth, polymeric substrates and the like. They are particularly useful for coating metals and elastomeric substrates that are found on motor vehicles. The compositions can be applied by conventional means including brushing, dipping, flow coating, spraying and the like, but they are most often applied by spraying. The usual spray techniques and equipment for air spraying and electrostatic spraying and either manual or automatic methods can be used. During application of the coating composition to the substrate, ambient relative humidity can range from about 30 to about 60 percent. The coating composition of the present invention is particularly advantageous when applied at an ambient relative humidity ranging from about 40 to about 60 percent, yielding very smooth finishes.

First, a basecoat coating composition is applied to the surface of the substrate to be coated. The basecoat coating composition can be waterborne, solventborne or powdered, and typically includes a film-forming resin, crosslinking material (such as are discussed above) and pigment. Non-limiting examples of suitable basecoat coating compositions include waterborne basecoats for color-plus-clear composites such as are disclosed in U.S. Pat. Nos. 4,403,003; 4,147,679; and 5,071,904, each of which is incorporated by reference herein.

After application of the coating to the substrate, a film is formed on the surface of the substrate by driving water out of the film by heating or by an air-drying period. Typically, the coating thickness ranges from about 0.1 to about 5 mils (about 2.54 to about 127 microns), and preferably about 0.4 to about 1.5 mils (about 10.16 to about 38.1 microns) in thickness.

The heating will preferably be only for a short period of time and will be sufficient to ensure that the topcoat can be applied to the basecoat if desired without the former dissolving the base coat composition. Suitable drying conditions will depend on the particular basecoat composition and on the ambient humidity, but in general a drying time of from about 1 to 5 minutes at a temperature of about 80–250° F. (20–121° C.) will be adequate to ensure that mixing of the two coats is minimized. At the same time, the basecoat film is adequately wetted by the topcoat composition so that satisfactory intercoat adhesion is obtained. Also, more than one base coat and multiple topcoats may be applied to develop the optimum appearance. Usually between coats, the previously applied coat is flashed, that is, exposed to ambient conditions 5 for about 1 to 20 minutes.

After application of the basecoat, the topcoat described in detail above is applied. Preferably, the topcoat coating composition is chemically different or contains different relative amounts of ingredients from the basecoat coating composition.

The topcoat coating composition can be applied to the surface of the basecoat by any of the coating processes discuss ed above for applying the basecoat coating composition to the substrate. The coated substrate is then heated to cure the coating layers. In the curing operation, solvents are driven off and the film-forming materials of the clearcoat and the basecoat are each crosslinked. The heating or curing operation is usually carried out at a temperature in the range of from 160–350° F. (71–177° C.) but if needed, lower or higher temperatures may be used as necessary to activate crosslinking mechanisms. The thickness of the clearcoat usually ranges from about 0.5 to about 5 mils (about 12.7 to about 127 microns), preferably about 1.0 to about 3 mils (about 25.4 to about 76.2 microns).

The present invention will further be described by reference to the following examples. The following examples are merely illustrative of the invention and are not intended to be limiting. Unless otherwise indicated, all parts are by weight.

EXAMPLE A

Example 1

A hydroxy functional acrylic polymer was prepared from the following ingredients:

| INGREDIENTS | AMOUNTS |
| --- | --- |
| Charge I | |
| Xylene | 449.8 |
| Charge II | |
| MPEG 350MA[1] | 18.5 |
| Hydroxyethyl methacrylate | 277.9 |
| Butyl acrylate | 218.6 |
| Styrene | 194.5 |
| Butyl methacrylate | 194.5 |
| Charge III | |
| MPEG 350 MA | 6.2 |
| Hydroxyethyl methacrylate | 92.6 |
| Butyl acrylate | 72.9 |
| Styrene | 64.9 |
| Butyl methacrylate | 64.9 |

-continued

| INGREDIENTS | AMOUNTS |
|---|---|
| Acrylic acid | 29.6 |
| Charge IV | |
| LUPERSOL 555[2] | 20.6 |
| Xylene | 84.7 |
| Charge V | |
| Butyl ether of diethylene glycol | 320.4 |
| Charge VI | |
| Methyl ether of propylene glycol | 214.1 |

[1]Methoxy polyethylene glycol methacrylate, available from International Specialty Chemicals, Southampton, U.K.
[2]t-Amyl peracetate, 60% active in mineral spirits, available from Atochem, Inc.

Charge I was added to a suitable reactor and heated to 120° C. At this temperature Charge IV was added over 210 minutes. Fifteen minutes after the start of Charge IV, Charge II was added over 120 minutes. After completion of Charge II, the reaction mixture was held at 120° C. for 15 minutes. Charge III was then added over 45 minutes. After the completion of Charge IV, the contents of the flask were held for one hour at 120° C. Charge V was added, and about 530 gram of xylene was stripped off. Finally, the product was diluted with Charge VI.

The finished product had about 70% weight percent solids and a weight average molecular weight ($M_w$) of about 35,000 grams per mole.

Example 2

A polymer composition was prepared by mixing 1000 grams of the hydroxy functional acrylic polymer of Example 1 above and 126 grams of Polyester A at a temperature of about 50° C. The composition and synthesis of Polyester A is disclosed in U.S. Pat. No. 5,468,802 as Example 2.

Coating Examples

Waterbased clearcoat compositions were prepared from the components indicated in Table 1. The clearcoat compositions were prepared by mixing charge I for 1 hour. Charges II, III, IV, V and VI were added individually and sequentially to form a resulting blend, with mixing after each addition. The time of mixing varied as follows for the charges indicated in ( ): (II) 1 hour, 20 minutes; (III) for 20 minutes; (IV) for 20 minutes; (V) for 30 minutes; and (VI) for one hour. The mixed resin blend was allowed to sit overnight. Charge VII was added in 10 gram aliquots until the first stated amount in Table 1. The dispersion was allowed to sit overnight. The remaining amount of Charge VII was added as the second amount given in Table 1 to bring the dispersion to the viscosity stated in Table 1 in seconds efflux cup in a #4 DIN cup at 25° C.

Example C had the first two components of Table 1 added as charge IA with mixing for 1 hour and the next two components were added as a charge IB to charge IA and mixed for 5 minutes. The remaining components were added as the indicated charges in examples A–C except the mixing after the addition of charges II and III were for 5 minutes and after charge IV was for 30 minutes.

TABLE 1

| Components | A | B | C |
|---|---|---|---|
| Charge I | | | |
| Polymer of Example 1 | 673.9 | — | 613.8 |
| Polyester from Example 2 | — | 659.9 | 54.2 |
| Diethylene glycol monobutyl ether | 24.9 | 25.5 | 25.2[a] |
| Propylene glycol | 69.5 | 71.0 | 70.3[a] |
| Charge II | | | |
| TINUVIN 1130[3] | 13.1 | 13.3 | 13.2 |
| TINUVIN 292[4] | 9.2 | 9.4 | 9.3 |
| Charge III | | | |
| Silicone oil | 3.8 | 3.9 | 3.9 |
| Charge IV | | | |
| Blocked isocyanate[5] | 228.9 | 234.1 | 231.7 |
| Charge V | | | |
| Cymel 328 melamine resin[6] | 191.0 | 159.6 | 157.9 |
| Charge VI | | | |
| Dimethyl amino propyl amine[7] | 120.5 | 123.2 | 120.4 |
| Charge VII | | | |
| Deionized water | 550/130 | 500/138 | 600.0?? |
| Viscosity (sec.) | 26 | 29 | 30 |

[3]TINUVIN 1130 UV absorber available from Ciba-Geigy AG.
[4]TINUVIN 292 hindered amine light stabilizer available from Ciba-Geigy AG.
[5]Methylethylketone blocked trimer of isophorone diisocyanate purchased from Huls Chemicals and diluted to 57% solid in Solvenon DIP dipropyleneglycol monoisopropyl ether.
[6]Cymel 328 partially alkylated melamine resin available from Cytec Industries.
[7]10% Aqueous solution.

Application

Each of the waterborne clearcoat examples was sprayed from an AERO bell in an environment controlled to 70° F. and 60% relative humidity. The coating was applied over commercial black waterborne basecoat available as Herberts Aqua Color Base 653195 from Herberts GmbH. The basecoat was applied in two coats, without a flash between coats, and then dehydrated for 10 minutes at 176° F. (80° C). The clearcoat was applied in two coats without any flash between the coats. The clearcoated panels were allowed to flash for three minutes at ambient condition, dehydrated for 10 minutes at 140° F. (60° C.) and baked for 30 minutes at 285° F. (140.5° C). Panels were baked in a horizontal position. The film build was approximately 2.0 mils (50.8 microns).

Analysis

Each of the coating examples was evaluated after baking for crater sensitivity. An entire 4 inch by 12 inch (10.16×30.5 cm.) panel was examined in each case and the total number of craters on each panel was counted.

Panels coated with clearcoat Examples B and C including amphiphilic adjuvants according to the present invention provided much greater resistance to crater formation than the panel coated with clearcoat Example A (control) formulated without the adjuvant.

Example B

Coating Examples

Waterbased coatings were prepared from the following ingredients set forth in Table 3:

TABLE 3

| Components | Parts by weight of Component | | |
|---|---|---|---|
| | A (control) | B | C |
| Binder emulsion: | | | |
| Acrylic emulsion[8] | 46.53 | 44.28 | 39.62 |
| Polyurethane emulsion[9] | 5.74 | — | 5.50 |
| silicone surfactant | 0.29 | 0.28 | 0.28 |
| silicone oil | 0.28 | 0.27 | 0.27 |
| Polyester from Example 2 | — | 2.58 | 2.60 |
| Deionized Water | 15.93 | 19.98 | 19.06 |
| Hardener solution: | | | |
| Trimer of HDI[10] | 9.52 | 10.11 | 10.02 |
| Trimer of IPDI[11] | 13.49 | 14.44 | 14.32 |
| TINUVIN 1130[12] | 1.73 | 1.65 | 1.66 |
| TINUVIN 292[13] | .87 | 0.83 | 0.83 |
| Butyl Diglycol Acetate | 5.62 | 5.60 | 5.84 |
| Total | 100.0 | 100.0 | 100.0 |
| % Solids | 45.1 | 45.1 | 45.1 |

[8]BAYHYDROL VP LS 2271 acrylic emulsion commercially available from Bayer Corporation.
[9]BAYHYDROL VP LS 2231 polyurethane emulsion commercially available from Bayer Corporation.
[10]DESMODUR VP LS 2025 trimer of hexamethylene diisocyanate commercially available from Bayer Corporation.
[11]DESMODUR Z 4470 SN trimer of isophorone diisocyanate commercially available from Bayer Corporation.
[12]TINUVIN 1130 UV absorber available from Ciba-Geigy AG.
[13]TINUVIN 292 hindered amine light stabilizer available from Ciba-Geigy AG.

The binder components and hardener components were pre-mixed respectively under agitation and then separately stored for one day. Approximately ½ hour prior to spray application, the binder emulsion and the hardener solution were pre-emulsified together with a lab stirrer. This pre-emulsion was further homogenized using high shear equipment.

The coatings were spray applied by hand with a SATA gun (1.3 mm nozzle) over a silver metallic waterborne basecoat (Moon Silber 96725 basecoat which is commercially available from PPG Industries, Inc.) which had been dehydrated for 10 minutes at 80° C. The clearcoat compositions were flashed for seven minutes at ambient temperature, dehydrated for ten minutes at 40° C. and then baked for thirty minutes at 130° C. The results of evaluations of the coated panels for gloss, hardness, delamination, humidity resistance and windshield adhesion are summarized below in Table 3. The gloss measurements were determined according to ISO 2813. Pendulum hardness was determined according to ISO 1522 (Köenig). The delamination test was conducted according to GM test method GME 60410. Humidity Resistance/Cross Hatch was determined according to DIN 50017/DIN EN ISO 2409. Windshield Adhesion was determined according to GM test QT 010201 including point 8.2.

TABLE 3

| Example | A | B | C |
|---|---|---|---|
| Gloss 20° | 87 | 83 | 85 |
| Pendulum Hardness | 171 | 209 | 237 |
| Delamination Test | fail | pass | pass |
| Humidity Resistance/Cross Hatch | Gt 5 | Gt 0 | Gt 0 |
| | fail | pass | pass |
| Windshield Adhesion | fail | pass | pass |

The multi-component composite coatings of Examples B and C (which included the polyester of Example 2 above, according to the present invention) exhibited better hardness, humidity resistance and wet adhesion properties than the control Example A which did not contain this polyester.

The multi-component composite coating compositions of the present invention can provide advantages in automotive coating applications including good crater resistance, leveling, workability, water soaking/delamination, windshield adhesion and resistance to adverse environmental conditions such as acid rain and humidity.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A multi-layer composite coating comprising a basecoat formed from an aqueous basecoat film-forming composition and a transparent topcoat deposited over the basecoat from an aqueous topcoat film-forming composition, the topcoat film-forming composition comprising:
   (a) at least one crosslinkable film-forming resin; and
   (b) at least one amphiphilic adjuvant having a hydroxyl number greater than 100 mg KOH/g adjuvant and comprising a water-soluble polar end comprising at least one terminal hydrophilic group and a water-insoluble hydrocarbon end comprising at least six contiguous carbon atoms, the adjuvant selected from the groups consisting of trimethylolpropane monoisostearate, di-trimethyolpropane isostearate, pentaerythritol isostearate, pentaerythritol diisostearate, stearyl diethanolamide, and mixtures thereof, wherein the adjuvant has an acid value of less than 30 and is present in an amount ranging from 0.01 to 25 weight percent on a basis of total resin solids of the topcoat film-forming composition.

2. The composite coating according to claim 1, wherein the crosslinkable film-forming resin is selected from the group consisting of polyesters, polyurethanes, acrylic polymers, polyamides, polyethers and mixtures thereof.

3. The composite coating according to claim 2, wherein the crosslinkable film-forming resin comprises an acrylic polyol polymer.

4. The composite coating according to claim 1, wherein the crosslinkable film-forming resin is present in an amount ranging from about 25 to about 95 weight percent on a basis of total resin solids of the topcoat film-forming composition.

5. The composite coating according to claim 1, wherein the adjuvant has an acid value of less than about 20.

6. The composite coating according to claim 5, wherein the adjuvant has an acid value of less than about 10.

7. The composite coating according to claim 6, wherein the adjuvant has an acid value of less than about 5.

8. The composite coating according to claim 1, wherein the adjuvant is saturated.

9. The composite coating according to claim 1, wherein the adjuvant is present in an amount ranging from about 0.1 to about 15 weight percent on a basis of total resin solids of the topcoat coating composition.

10. The composite coating according to claim 1, wherein the topcoat coating composition further comprises at least one crosslinking material capable of reacting with the film-forming resin to form a crosslinked film.

11. The composite coating according to claim 10, wherein the crosslinking material is present in an amount ranging from about 5 to about 50 weight percent on a basis of total resin solids of the topcoat coating composition.

12. The composite coating according to claim 10, wherein the crosslinking material is selected from the group consisting of blocked or unblocked aminoplasts, polyisocyanates, polyacids, anhydrides and mixtures thereof.

13. The composite coating according to claim 1, wherein the basecoat film-forming composition is selected from the group consisting of waterborne coating compositions, solventborne coating compositions and powder coating compositions.

14. The composite coating according to claim 13, wherein the basecoat film-forming composition is a waterborne coating composition.

15. A multi-layer composite coating comprising a basecoat formed from an aqueous basecoat film-forming composition and a transparent topcoat deposited over the basecoat from an aqueous topcoat film-forming composition, the topcoat film-forming composition comprising:
  (a) at least one crosslinkable film-forming resin; and
  (b) at least one amphiphilic adjuvant having a hydroxyl number greater than 100 mg KOH/g adjuvant and comprising a water-soluble polar end comprising at least one terminal hydrophilic group and a water-insoluble hydrocarbon end comprising at least six contiguous carbon atoms, the adjuvant comprising the reaction product of isostearic acid, trimethylolpropane and 1,4-cyclohexane dicarboxylic acid, wherein the adjuvant has an acid value of less than 30 and is present in an amount ranging from 0.01 to 25 weight percent on a basis of total resin solids of the topcoat film-forming composition.

16. A multi-layer composite coating composition, comprising a basecoat formed from an aqueous basecoat film-forming composition and a transparent topcoat deposited over the basecoat from an aqueous topcoat film-forming composition, the topcoat film-forming composition comprising:
  (a) at least one crosslinkable film-forming resin; and
  (b) at least one amphiphilic adjuvant having a hydroxyl number greater than 100 mg KOH/g adjuvant and comprising a water-soluble polar end comprising at least one terminal hydrophilic group and a water-insoluble hydrocarbon end comprising at least six contiguous carbon atoms, the adjuvant comprising a reaction product prepared from reactants comprising at least one amine comprising at least six contiguous carbon atoms and at least one reactant selected from the group consisting of carbonates, and polycarboxylic acids and polyols.

17. The composite coating according to claim 16, wherein the reaction product is N-stearyl dihydroxypropyl carbamate.

18. A multi-layer composite coating comprising a basecoat formed from an aqueous basecoat film-forming composition and a transparent topcoat deposited over the basecoat from an aqueous topcoat film-forming composition, the topcoat film-forming composition comprising:
  (a) at least one crosslinkable film-forming resin; and
  (b) at least one amphiphilic adjuvant having a hydroxyl number greater than 100 mg KOH/g adjuvant and comprising a water-soluble polar end comprising at least one terminal hydrophilic group and a water-insoluble hydrocarbon end comprising at least six contiguous carbon atoms, the adjuvant comprising a reaction product which is prepared from reactants comprising at least one monocarboxylic acid and at least one epoxide.

19. The composite coating according to claim 18, wherein the adjuvant is the reaction product of isostearic acid and glycidol.

20. A substrate having on at least a portion of a surface thereof a multi-layer composite coating comprising a basecoat formed from an aqueous film-forming composition and a transparent topcoat deposited over the basecoat from an aqueous topcoat film-forming composition, the topcoat film-forming composition comprising:
  (a) at least one crosslinkable film-forming resin; and
  (b) at least one amphiphilic adjuvant comprising a water-soluble polar end comprising at least one terminal hydrophilic group and a water-insoluble hydrocarbon end comprising at least six contiguous carbon atoms, the adjuvant selected from the group consisting of trimethylolpropane monoisostearate, di-trimethyolpropane isostearate, pentaerythritol isostearate, pentaerythritol diisostearate, stearyl diethanolamide, and mixtures thereof, wherein the adjuvant has an acid value of less than 30 and is present in an amount ranging from about 0.01 to about 25 weight percent on a basis of total resin solids of the topcoat film-forming composition.

21. A substrate having on at least a portion of a surface thereof a multi-layer composite coating comprising a basecoat formed from an aqueous film-forming composition and a transparent topcoat deposited over the basecoat from an aqueous topcoat film-forming composition, the topcoat film-forming composition comprising:
  (a) at least one crosslinkable film-forming resin; and
  (b) at least one amphiphilic adjuvant comprising: a water-soluble polar end comprising at least one terminal hydrophilic group and a water-insoluble hydrocarbon end comprising at least six contiguous carbon atoms, the adjuvant comprising the reaction product of isostearic acid, trimethylolpropane and 1,4-cyclohexane dicarboxylic acid, wherein the adjuvant has an acid value of less than 30 and is present in an amount ranging from about 0.01 to about 25 weight percent on a basis of total resin solids of the topcoat film-forming composition.

* * * * *